United States Patent [19]
D'Agostino

[11] 4,252,996
[45] Feb. 24, 1981

[54] CONVERTIBLE ACOUSTIC TELEPHONE COUPLER

[75] Inventor: Bernardino R. D'Agostino, Windsor Locks, Conn.

[73] Assignee: Hi-G Incorporated, Windsor Locks, Conn.

[21] Appl. No.: 91,135

[22] Filed: Nov. 5, 1979

[51] Int. Cl.³ .......................................... H04M 11/00
[52] U.S. Cl. ..................................................... 179/1 C
[58] Field of Search ............................... 179/1 C, 2 C

[56] References Cited
U.S. PATENT DOCUMENTS 3,619,507  11/1971  Metz ..................................... 179/1 C Primary Examiner—Bernard Konick
Assistant Examiner—Joseph A. Popek
Attorney, Agent, or Firm—Hayes & Reinsmith

[57] ABSTRACT

Telephone coupling devices which are used to connect various devices into telephone networks without electrical connections require structure which will provide effective acoustic coupling with telephone handsets produced by a variety of manufacturers, many of which differ from each other not only in major dimensional characteristics but also in specific construction. An acoustic coupler having a dimensionally bi-stable flexible coupling element permits use of the coupler of the present invention with an unlimited number of telephone handset configurations.

7 Claims, 3 Drawing Figures

CONVERTIBLE ACOUSTIC TELEPHONE COUPLER

BACKGROUND OF THE INVENTION

The present invention relates to telephone coupling devices for use in communications networks whereby the transducer of the telephone handset and the transducer of the acoustic coupler are maintained in effective acoustical coupling relationship.

Portable computer terminals and similar devices intended to communicate with central data processing facilities must be able to be effectively coupled to telephone lines to provide for the desired data transmission. The development and common use of telephone equipment from a variety of diverse manufacturers has created significant problems tending to reduce the effectiveness of such portable terminals because the necessity for effective coupling to the telephone handset has become a problem of some complexity and importance tending to restrict the hoped for universal usage of such portable terminals. It is not uncommon that a telephone coupler intended for a standard handset such as manufactured by Western Electric is unusuable with the increasingly common handsets identified by the general designation Trimline handsets and handphones. One typical solution of the problem involves special interface or transition units disposed between "Trimline" handsets and the coupler thereby significantly lowering the effectiveness of the sound transmission. Typical of prior art acoustic telephone couplers intended for use with telephone handsets of standard design can be found in U.S. Pat. Nos. 3,719,783, 3,733,437, and 3,992,583. Additionally, telephone couplers have been developed which are intended to be strapped to the telephone handset such as are discussed in U.S. Pat. Nos. 3,180,937, 3,299,207 and 3,619,507. Thus, the known prior art has not provided a universally useful telephone coupler which is effectively self-contained and ready for use with a variety of handsets.

OBJECTS OF THE INVENTION

It is therefore a principal object of this invention to provide a telephone coupler which is susceptible of facile use with standard telephone handsets as well as the less common Trimline handsets and the like.

It is a further object of this invention to provide a telephone coupler capable of virtually universal use with a wide variety of telephone handsets without necessitating use of devices which reduce the effectiveness of the acoustic coupling.

It is an additional object of this invention to provide an acoustic coupling device which is easily usable by untrained personnel with a variety of handset telephone configurations.

It is a still further object of this invention to provide a telephone coupler, susceptible to a substantially universal usage, which coupler is easily manufactured, low in cost and durable and effective in operation.

Other objects will be in part obvious and in part pointed out in more detail hereinafter.

A better understanding of the objects, advantages, features, properties and relations of this invention will be obtained from the following detailed description and accompanying drawing which sets forth an illustrative embodiment and is indicative of the way in which the principle of this invention is employed.

DESCRIPTION OF THE PREFERRED EMBODIMENT

Figure 1:
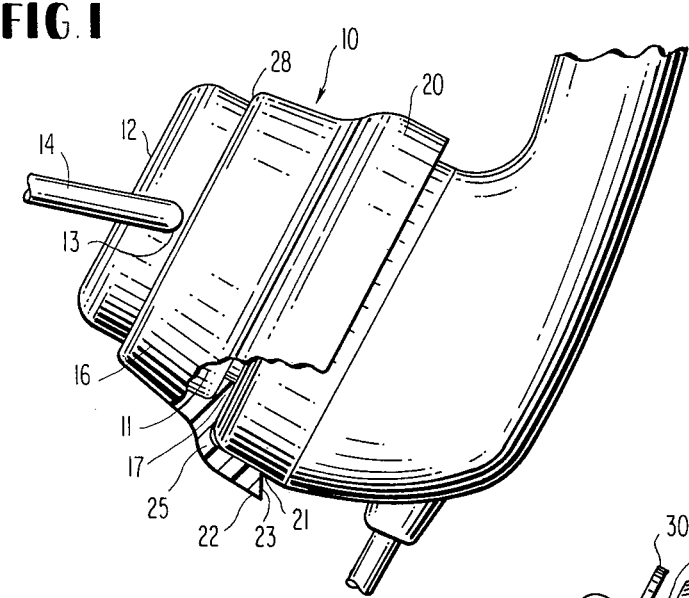
FIG. 1 shows the telephone coupler of this invention attached to a standard telephone handset, the view being partially broken away to show a portion of the coupler construction.

Turning first to FIG. 1, the acoustic coupler generally designated 10 is generally cup-shaped in external configuration and is formed from a suitable elastomeric material such as rubber or suitable plastics, which material may or may not contain sound absorption material such as lead particles intended to isolate the acoustical transducer 11 from environmental noise. The cup-shaped coupler in its exterior configuration is characterized by a closed bottom wall 12 suitably apertured at 13 for the electrical connections 14 extending to the transducer 11. Intermediate housing portion 16 defines an interior compartment for transducer 11, which transducer is fixed in position between the annular wall abutment 17 (see FIG. 2) and annular shoulder 18; extending from annular shoulder 18 there is provided a cylindrical skirt 20, which skirt is of sufficient axial length to embrace the sidewall 21 of the telephone handset, the interior diameter of cylindrical skirt 20 being slightly less than the outside diameter of the handset portion 21 so as to be deformable into frictional engagement with handset portion 21 to thereby retain acoustic coupler 10 in position on the handset. It is important to note that annular shoulder 17 establishes a slight spacing between the handset and transducer 11 and because of its resiliency, it tends to damp unwanted vibrations from being transmitted from the handset to the transducer 11. For ease of installation, rim 22 is provided with an inwardly tapering edge 23 to facilitate "slip-on" installation of the telephone coupler onto the handset.

Figure 2:
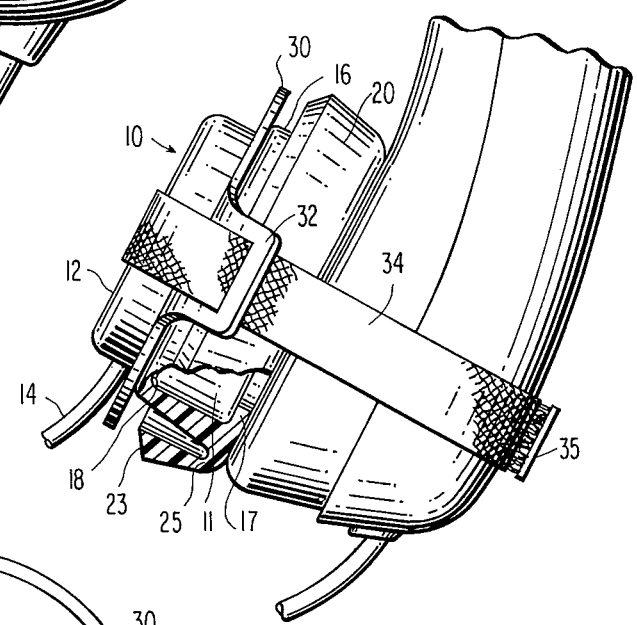
FIG. 2 is a plan view showing the coupler used with non-standard telephone handsets which require auxiliary mounting, a portion of the telephone coupler being cut away to show interior construction.
Figure 3:
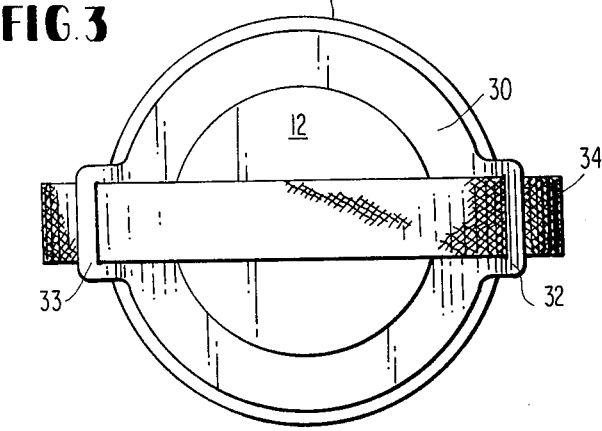
FIG. 3 is a top plan view of the coupler with the mounting ring and strap in place.

Turning next to FIGS. 2 and 3 for description of a principal feature of this invention which permits utilization of the telephone coupler with non-standard telephone handsets, it is seen that skirt 20, because of its enlarged diameter relative to intermediate portion 16 and because of the slightly reduced sidewall thickness of the skirt at 25 adjacent to the annular shoulder 17, it is possible to deflect the resilient skirt 20 from a position facing inward the handset to a position facing away from the handset thereby to permit shoulder 17 of the coupler to be brought into engagement with the handset without interference from the cylindrical skirt. The flexible nature of the skirt makes such deflection a simple act requiring little skill. Such non-standard handsets, because they present no outwardly extending portion including the telephone acoustic transducer necessitate supplementary holding means which can be of any suitable type depending upon the nature and length of the data transmission that is desired. In the illustrated embodiment, there is provided an exterior annular shoulder 28 disposed between intermediate portion 16 of the coupler and bottom portion 12 which shoulder permits a mounting ring 30 to be positioned thereon, which mounting ring is provided with downwardly deflected apertured tabs 32 and 33 which retain a mounting strap 34 which can be used to effectively secure the coupler in close acoustical coupling relationship, the strap 34 having a simple fastener 35 such as that sold under the trademark VELCRO.

Because the acoustic coupler of this invention is preferably formed as a unitary elastomeric member, transducer 11 is easily inserted into and trapped by the compartment defined by shoulder 17, upper abutment 18 and the intermediate sidewall portion 16. The transducer is however supported in a sound and a mechanical vibration isolated manner by the elastomeric material. Moreover, the transducer is supported in close proximity to the transducer of the telephone handset regardless of the style of that handset. Mounting ring 30 can be permanently affixed to the assembly by providing a simple molded groove adjacent the exterior shoulder so as to retain the ring and strap in position or it can be provided as a separate accessory for easy installation and use.

It is therefore seen that I have provided a low cost effective telephone coupler for use with a wide variety of telephone handset styles and configurations, which coupler ensures effective sound transmission between the telephone handset and the acoustic transducer of the telephone coupler with a construction that is low in cost and easily changed from one stable skirt position to a second stable skirt position while maintaining the desired effective coupling.

As will be apparent to persons skilled in the art, various modifications, adaptations and variations of the foregoing specific disclosure can be made without departing from the teachings of the present invention.

I claim:

1. A flexible coupling element for an acoustic coupler for achieving effective acoustic coupling between the acoustic transducer of a telephone handset or the like and the acoustic transducer of the acoustic couple comprising a housing including a resilient radially extending annular shoulder disposed adjacent to the acoustic transducer of the coupler and a generally cylindrical skirt formed of resilient material having a first stable position extending from said annular shoulder to define an open ended compartment for receiving the extending portion of a telephone handset so as to position the coupler transducer in effective acoustical coupling relationship with the telephone handset transducer, said cylindrical skirt being resiliently deflectable to a second stable position wherein said shoulder is presented for substantially unobstructed engagement with a telephone handset.

2. The coupling element of claim 1 wherein said cylindrical skirt is dimensioned to engage and grasp the extending portion of the telephone handset when in said first stable position thereby to mount the coupler on the handset.

3. The coupling element of claim 1 wherein strap means are provided for mounting the coupler to the handset when said skirt is in the second stable position.

4. The coupling element of claim 2 wherein the rim of said skirt is provided with an inwardly directed taper to facilitate acceptance therein of the extending portion of the telephone handset.

5. The coupling element of claim 1 wherein the housing is cup-shaped and formed integrally with the skirt and shoulder of resilient material and the transducer of the coupler is insertable to a position disposed between said shoulder and the bottom of the cup by resiliently deforming said shoulder.

6. The coupling element of claim 5 wherein the sidewall of the cup-shaped housing is of reduced diameter adjacent the bottom thereof to present an exterior shoulder, a mounting ring is positioned on said shoulder, and a strap engaging said ring and the bottom of the cup-shaped housing is provided for securing the coupler to a telephone handset when said skirt is in the second stable position.

7. The coupling element of claim 6 wherein the sidewall thickness of the cylindrical skirt is reduced to permit easy deflection of the skirt from one stable position to the other.

* * * * *